Patented Nov. 19, 1935

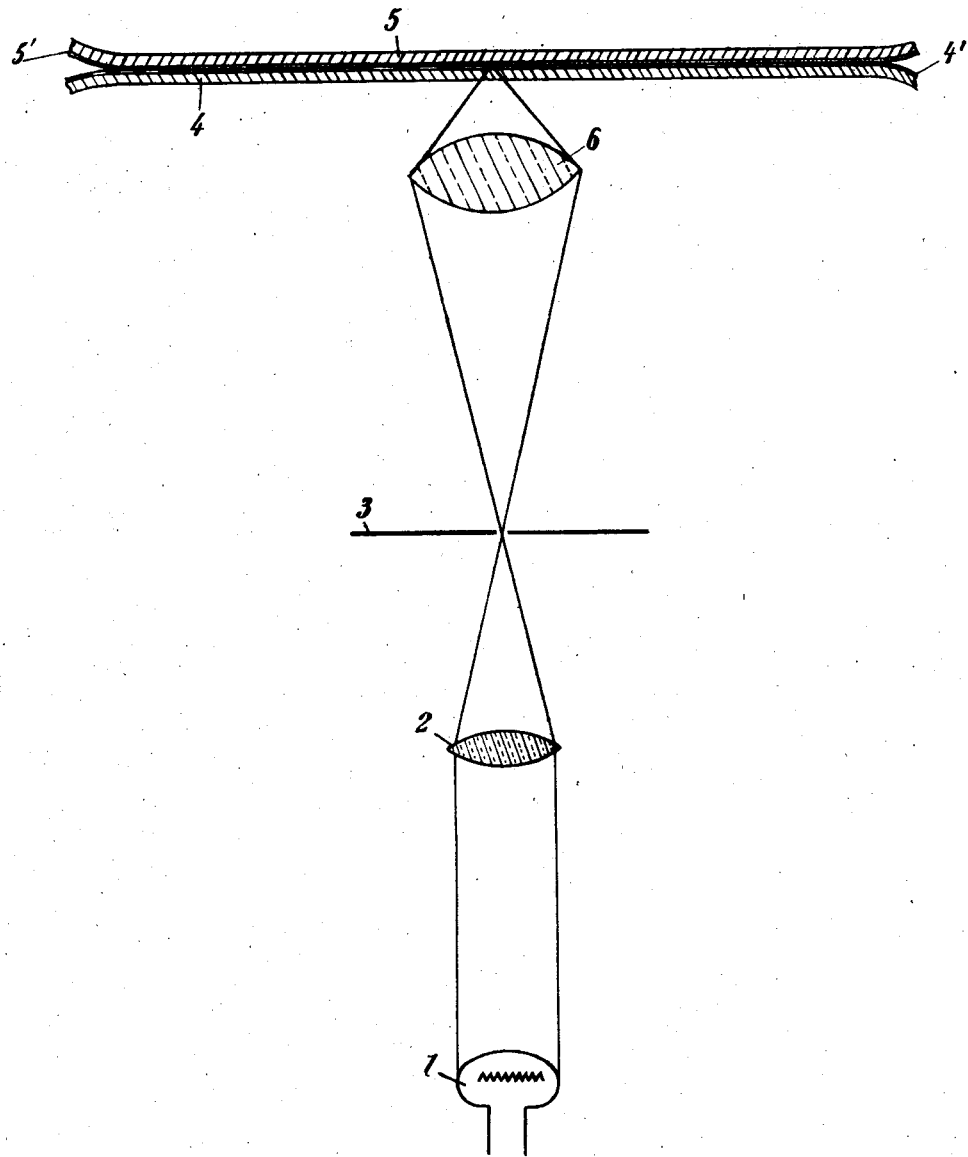

2,021,264

UNITED STATES PATENT OFFICE 2,021,264

PRINTING DEVICE FOR SOUND FILMS

Richard Schmidt, Dessau in Anhalt, Germany, assignor to Agfa Ansco Corporation, Binghamton, N. Y., a corporation of New York Application August 4, 1931, Serial No. 555,094
In Germany August 20, 1930

1 Claim. (Cl. 95—75)

The present invention relates to sound film pictures and more particularly to a printing device for sound films.

When printing photographic sound records, losses occur in the high frequencies above all in consequence of a bad contact between the negative and positive films. The narrower the slit for the printing light is, the more this source of error is eliminated. In the usual printing devices it is, however, not possible to diminish to any desired degree the breadth of the copying slit touching the negative film, since, otherwise, dust particles can easily settle therein.

According to this invention the beam of printing light rays is sufficiently narrowed by arranging before the illuminated slit an optical element projecting the slit in a reduced form on to the negative. The breadth of the pencil of rays falling on the film can thus be reduced to 10–100 $\mu$. Any suitable objective is utilized as optical element for this purpose. There is preferably used an objective of an aperture as large as possible which projects the pencil of rays on the negative film in the form of a broad cone as short as possible. In such a cone, any scratches which may exist in the negative support absorb a smaller part of the incident light than in a long narrow cone.

The accompanying drawing diagrammatically illustrates a copying device according to this invention. As source of light is used the incandescent lamp 1, whose light is projected by a condenser 2 on the copying slit 3. The negative film 4 bearing the sound record in the layer 4' and the positive film 5 provided with the emulsion layer 5' do not run directly behind the copying slit 3, but they are arranged at a certain distance from it. Between the copying slit and the negative film the objective 6 is placed, which projects the pencil of rays coming from the copying slit on the negative film in a reduced form, said negative film being in contact with the emulsion of the positive film. Obviously the distance at which the film bands are guided behind the slit 3 is dependent on the focus length of the objective 6 and may be determined in the known manner.

I may use for instance an objective of 20 mm. focus length and an aperture F:1,5 (or even more). The distance of the film bands from the diaphragm slit 3 depends from the breadth of the slit and from the desired degree of reduction. If, for instance, a slit of 100 $\mu$ breadth is to be reproduced in a breadth of only 10 $\mu$, the distance between the slit and the objective in question is 220 mm. and the distance between objective and film is 22 mm. These distances may, however, be modified when using another objective, another diaphragm or if another reduction of the breadth of the slit is desired.

What I claim is:

In combination with a negative photographic sound record and a light-sensitive positive film in contact therewith, a source of light, a slit diaphragm and an optical element having an aperture at least as great as that of an F 1.5 lens projecting a broad cone of light, and reproducing a reduced image of the slit of said diaphragm upon the negative.

RICHARD SCHMIDT.